US012581148B2

(12) United States Patent
Dufresne

(10) Patent No.: US 12,581,148 B2
(45) Date of Patent: Mar. 17, 2026

(54) DYNAMIC SUPPLEMENTAL CONTENT SELECTION

(71) Applicant: DISH Network L.L.C., Englewood, CO (US)

(72) Inventor: Jessica Michelle Dufresne, Jersey City, NJ (US)

(73) Assignee: DISH NETWORK L.L.C., Englewood, CO (US)

( * ) Notice: Subject to any disclaimer, the term of this patent is extended or adjusted under 35 U.S.C. 154(b) by 76 days.

(21) Appl. No.: 18/622,073

(22) Filed: Mar. 29, 2024

(65) Prior Publication Data

US 2024/0348854 A1 Oct. 17, 2024

Related U.S. Application Data

(60) Provisional application No. 63/495,430, filed on Apr. 11, 2023.

(51) Int. Cl.
*H04N 21/2668* (2011.01)
*G06Q 30/0273* (2023.01)
*H04N 21/81* (2011.01)

(52) U.S. Cl.
CPC ..... *H04N 21/2668* (2013.01); *G06Q 30/0275* (2013.01); *H04N 21/812* (2013.01)

(58) Field of Classification Search
CPC ............. H04N 21/2668; H04N 21/812; H04N 21/44218; H04N 21/4532; G06Q 30/0275
USPC .......................................................... 725/34
See application file for complete search history.

(56) References Cited

U.S. PATENT DOCUMENTS

| | | | | |
|---|---|---|---|---|
| 6,324,519 B1 * | 11/2001 | Eldering | ............ | G06Q 30/0275 705/37 |
| 9,129,313 B1 * | 9/2015 | Farmer | .............. | G06Q 30/0275 |
| 10,290,025 B1 * | 5/2019 | Howes | ............... | G06Q 30/0261 |
| 2010/0057556 A1 * | 3/2010 | Rousso | ................... | G06Q 30/02 705/14.54 |

(Continued)

OTHER PUBLICATIONS

OpenRTB Specification v3.0, iab. TECH LAB, https://github.com/InteractiveAdvertisingBureau/openrtb/blob/master/OpenRTB%20v3.0%20FINAL.md, Mar. 2022, 35 pages.

(Continued)

*Primary Examiner* — Cynthia M Fogg
(74) *Attorney, Agent, or Firm* — Seed Intellectual Property Law Group LLP

(57) ABSTRACT

Systems and methods are described herein for selecting supplemental content for a viewer based on bid responses received from supplemental-content sources for a supplemental-content bid request provided in parallel. A supplemental-content request is received from a content receiver for a viewer. The supplemental-content request is modified based on viewer-specific data that is obtained for the viewer. A supplemental-content bid request is generated based on the modified supplemental-content request and provided to a plurality of supplemental-content sources. Bid responses are received from one or more of the plurality of supplemental-content sources. One or more bids from the bid responses for the supplemental-content request are selected based on obtained supplemental-content statistics. Supplemental content associated with the one or more selected bids is provide to the content receiver to fulfill the supplemental-content request.

20 Claims, 4 Drawing Sheets

(56) References Cited

U.S. PATENT DOCUMENTS

| 2015/0051997 | A1* | 2/2015 | Taoussanopoulos ... | G06Q 30/08 |
| | | | | 705/26.3 |
| 2020/0219129 | A1* | 7/2020 | Andrades ........... | G06Q 30/0246 |
| 2020/0219145 | A1* | 7/2020 | Kalampoukas .... | G06Q 30/0277 |
| 2022/0007065 | A1* | 1/2022 | Facey ................ | H04N 21/4348 |
| 2022/0329888 | A1* | 10/2022 | Fairchild ........... | G06Q 30/0246 |
| 2024/0046315 | A1* | 2/2024 | Hobbs ................ | G06Q 30/0272 |

OTHER PUBLICATIONS

OpenRTB Guidelines, iab., https://www.iab.com/guidelines/real-time-bidding-rtb-project/, accessed Jun. 11, 2024, 2 pages.

* cited by examiner

DYNAMIC SUPPLEMENTAL CONTENT SELECTION

BACKGROUND

Over the past several years, set-top boxes have greatly improved the television viewing experience for viewers. This improvement has been aided by the number of content channels that are available to listen or watch at any given time, the quality of video and audio output devices, and the quality of the input signal carrying the content. By improving the television viewing experience, viewers tend to increase the amount of time consuming content, which also increases the number of advertisements presented to the viewer.

Many content providers rely on a payment system to determine which advertisements to provide to a viewer. These payment systems, however, can be limited to specific pools of advertisements from which it can select and present to viewers. As a result, content providers can miss out on opportunities to select other advertisements that may provide higher payments to have their advertisements presented to viewers. It is with respect to these and other considerations that the embodiments herein have been made.

BRIEF SUMMARY

Embodiments are generally directed to systems and methods for selecting supplemental content for a viewer based on bid responses received from supplemental-content sources for a supplemental-content bid request provided in parallel. A supplemental-content request is received from a content receiver for a viewer. The supplemental-content request is modified based on viewer-specific data that is obtained for the viewer. A supplemental-content bid request is generated based on the modified supplemental-content request and provided to a plurality of supplemental-content sources. Bid responses are received from one or more of the plurality of supplemental-content sources. One or more bids from the bid responses for the supplemental-content request are selected based on obtained supplemental-content statistics. Supplemental content associated with the one or more selected bids is provide to the content receiver to fulfill the supplemental-content request.

Embodiments described herein improve the efficiency of supplemental content delivery to viewers. Transmitting supplemental content that is not viewed by the viewer or is of little interest to the viewer results in excess network traffic and wasted computer resources. Utilizing a parallel multi-supplemental-content source bid request system, as described herein, can result in providing more directed supplemental content to the viewer, while also improving bid collection rates by the system, which improves computing resource utilization.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
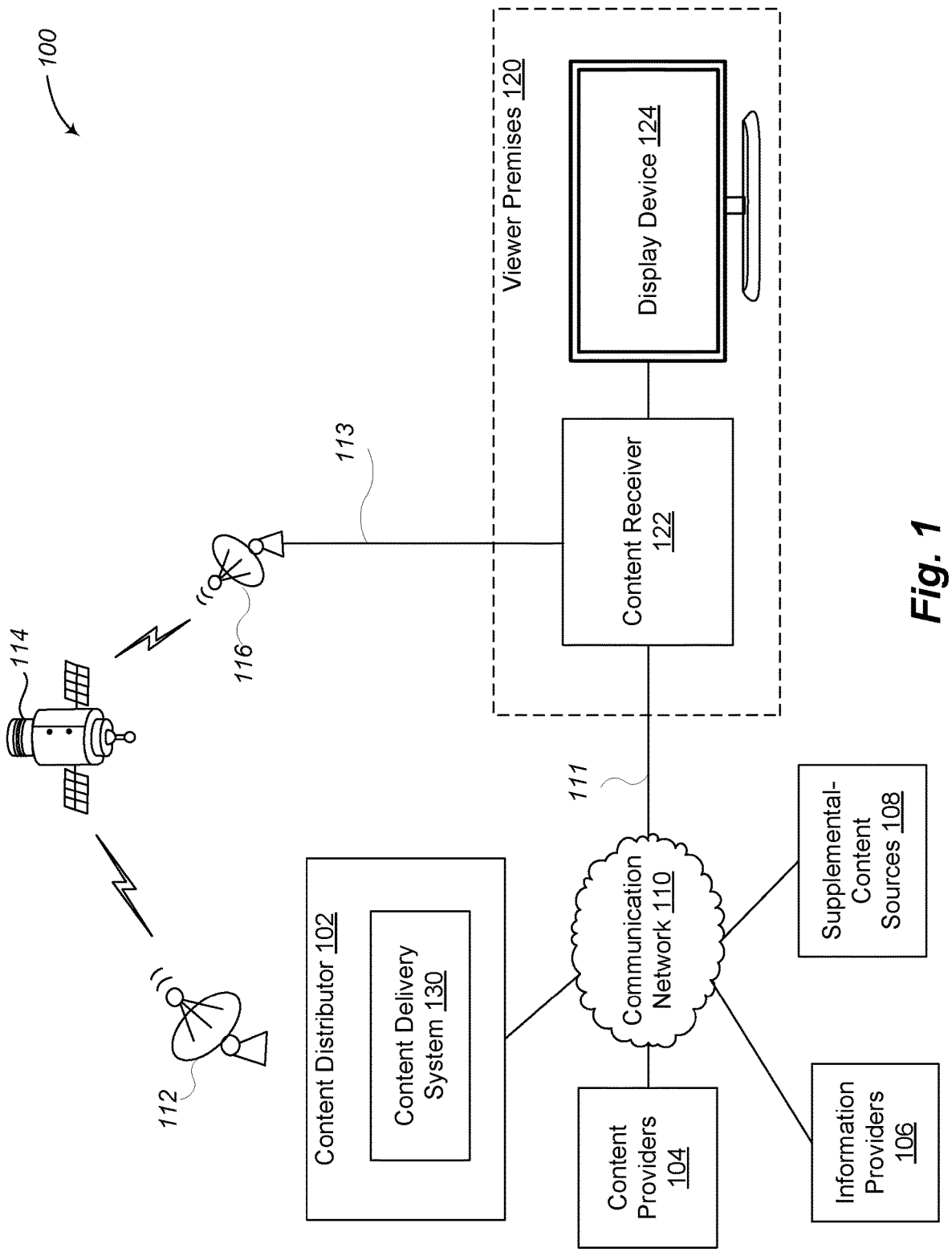
FIG. 1 illustrates a context diagram of an environment for providing content to a viewer in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "viewer" refer to a person or persons watching or viewing content on a display device. Although embodiments described herein utilize viewer in describing the details of the various embodiments, embodiments are not so limited. For example, in some implementations, the term "viewer" may be replaced with the term "user" throughout the embodiments described herein. A "user" refers more generally to a person or persons consuming content. Accordingly, a user may be listening to audio content, watching visual content, or consuming audiovisual content.

References herein to the term "content" refer to audio, visual, or audiovisual content that is presented to a viewer. Examples of content include text, graphics, video, or other information presented to the viewer, which may include, but is not limited to, television or radio programs, sports broadcasts, news feeds, advertisements, and other types of displayable or audible content. Similarly, "supplemental content" refers to audio, visual, or audiovisual content that is presented to a viewer after, during, or in the middle of presenting other content to the viewer. For example, in some embodiments, the content may be a television program, and the supplemental content may be an advertisement that is presented to the viewer during a commercial break in the television program. In another embodiment, the content may be a first advertisement presented to the viewer during a commercial break of a television program, and the supplemental content may be a second advertisement that is presented to the viewer following the presentation of the first advertisement. Accordingly, supplemental content includes text, graphics, video, or other information presented to the viewer, which may include, but is not limited to, television or radio programs, sports broadcasts, news feeds, advertisements, and other types of displayable or audible content, which is presented to the viewer after, during, or in the middle of presenting other content to the viewer.

FIG. 1 illustrates a context diagram of an environment 100 for providing content to a viewer in accordance with embodiments described herein. Environment 100 includes content providers 104, information providers 106, content distributor 102, supplemental-content sources 108, communication network 110, and viewer premises 120.

Viewer premises 120 includes a content receiver 122, a display device 124, and a camera 126. The content receiver 122 is a computing device that receives content and supplemental content for presentation on the display device 124 to a viewer on the viewer premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

Although FIG. 1 illustrates the content receiver 122 as providing content for display on a display device 124 located on the viewer premises 120, embodiments are not so limited. In some embodiments, the content receiver 122 may provide the content to a viewer's mobile device (not illustrated), such as a smartphone, tablet, or other computing device, that is at a remote location to the viewer premises 120. In yet other embodiments, the content receiver 122 and the display device 124 may be integrated into a single computing device, such as the viewer's desktop computer, laptop computer, smart phone, tablet computer, etc.

In various embodiments, the content distributor 102 provides content and supplemental content to the content receiver 122. The content distributor 102 may receive a plurality of different content and supplemental content from one or more content providers 104, one or more information providers 106, one or more supplemental-content sources 108, or a combination thereof. In various embodiments, the content distributor 102 receives bid responses from supplemental-content sources 108 and selects which supplemental content to provide with other primary content being provided to the content receiver 122. For example, the content distributor 102 receives a television program (primary content) from one content provider 104 and an advertisement (supplemental content) from a different content provider 104. While the content distributor 102 is providing the television program to the content receiver 122 it selects supplemental content to insert into the television program, as described herein.

In various embodiments, the content distributor 102 includes a content delivery system 130 to select which supplemental content to present to the viewer along with the primary content being presented to the viewer. Embodiments of the content delivery system 130 are described herein. Briefly, however, the content delivery system 130 generates supplemental-content bid requests that are provided to a plurality of supplemental-content sources 108 in parallel. The content delivery system 130 receives bid responses from one or more of the supplemental-content sources 108, selects one or more bid responses, and processes and provides the supplemental content for those selected bid responses to the content receiver 122 for presentation to a viewer.

The following briefly discusses additional components in example environment 100. The content distributor 102 provides content and supplemental content, whether obtained from content provider 104 or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120 via link 113.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

The supplemental-content sources 108 generate, aggregate, and/or otherwise provide supplemental content that is provided to one or more viewers. As described herein, the supplemental-content sources 108 receive supplemental-content bid requests and prepare bid responses that match requirements or rules of the bid requests. In some embodiments, the supplemental-content sources 108 directly provide bid responses and supplemental content to the content distributor 102. In other embodiments, the supplemental-content sources 108 provides a marketplace or other supplemental content distribution platform for downstream supplement-content providers. Various examples of the supplemental-content sources 108 may include, but are not limited to, FreeWheel (direct sales or local re-sellers), SSPs (Telaria, Magnite, SpotX, Roku, Google, etc.), DSPs, etc.

In at least one embodiment, information provider 106 creates and distributes data or other information that describes or supports content. Generally, this data is related to the program content provided by content provider 104. For example, this data may include metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks, which may include cellular networks.

Figure 2:
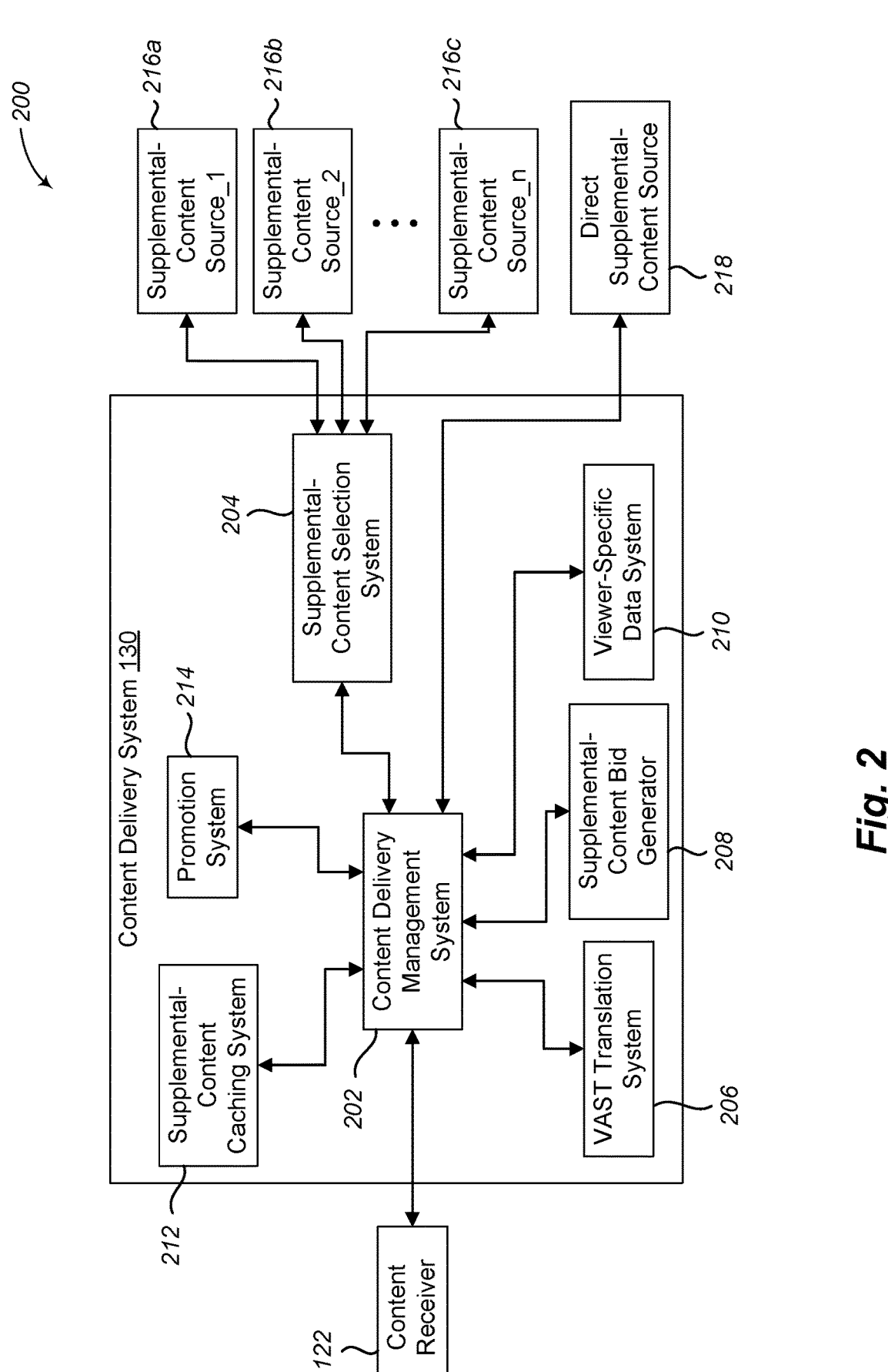
FIG. 2 illustrates a system diagram of a system for selecting supplemental content in accordance with embodiments described herein.

FIG. 2 illustrates a system diagram of a system 200 for selecting supplemental content in accordance with embodiments described herein. System 200 includes the content receiver 122 of FIG. 1, the content delivery system 130 of FIG. 1, supplemental-content sources 216a-216c, and direct supplemental-content sources 218. The supplemental-content sources 216a-216c and the direct supplemental-content sources 218 may be embodiments of the supplemental-content sources 108 in FIG. 1.

The content delivery system 130 includes a content delivery management system 202, a supplemental-content selection system 204, a VAST translation system 206, a supplemental-content bid generator 208, a viewer-specific data system 210, a supplemental-content caching system 212, and a promotion system 214.

The content delivery management system 202 is configured to receive a supplemental-content request from the content receiver 122 and provide supplemental content associated with selected bids to the content receiver 122. The content delivery management system 202 may receive viewer-specific data from the viewer-specific data system 210 to modify the supplemental-content request. The content delivery management system 202 can utilize the supplemental-content bid generator 208 to generate a supplemental-content bid request for the modify supplemental-content request. In some embodiments, the content delivery management system 202 provides the supplemental-content bid request to the supplemental-content selection system 204 to be provided to one or more supplemental-content sources 216a-216c. In other embodiments, the content delivery management system 202 provides the supplemental-content bid request to one or more direct supplemental-content sources 218.

The supplemental-content selection system 204 is configured to receive the supplemental-content bid request from the content delivery management system 202 and provide it to the supplemental-content sources 216a-216c. The supplemental-content selection system 204 receives bid responses from one or more of the supplemental-content sources 216a-216c. The supplemental-content selection system 204 is configured to select one or more bids from the received bid responses, such that supplemental content associated with the selected bids is provided to the content receiver 122. The supplemental-content selection system 204 provides the selected bids to the content delivery management system 202.

In various embodiments, the supplemental-content selection system 204 utilizes various rules, requirements, and configurations to select which supplemental-content sources 216a-216c are to receive bid requests and how to select one or more bids from the received bid responses. In some embodiments, these rules, requirements, and configurations may be stored for individual viewers, groups of viewers, types of content receivers, types of viewers, etc. For example, the supplemental-content selection system 204 may determine which supplemental-content sources are to be guaranteed to have their supplemental content selected for the supplemental-content request received from the content receiver 122. In some embodiments, the supplemental-content selection system 204 may prioritize supplemental-content sources or supplemental content based on the rules, requirements, and configurations being utilized, such that bid responses from higher priority supplemental-content sources or associated with higher priority supplemental content is selected above or more frequently compared to bid responses from lower priority supplemental-content sources or associated with lower priority supplemental content.

In various embodiments, the supplemental-content selection system 204 may be configured to modify the selected bid response for the content delivery management system 202. For example, the supplemental-content selection system 204 can modify the bid response to include a supplemental-content identifier that informs the content delivery management system 202 of specific details regarding the associated supplemental content. These specific details can identify the supplemental-content source, the storage location of the supplemental content, target impressions, duration, etc. In at least one embodiment, the supplemental-content selection system 204 may generate a unique URL for the supplemental content that includes these specific details.

The supplemental-content selection system 204 may employ one or more machine learning techniques to determine which supplemental-content sources to send a supplemental-content bid request or to select one or more winning bid responses. Such machine learning techniques may also be utilized to learn how supplemental content is perceived by viewers and how the requirements of bid requests may change over time (e.g., how quickly target impressions are reached different supplemental content during different periods of the month for different viewers for different content).

The VAST (Video Advertisement Serving Template) translation system 206 may be configured to communicate with the content delivery management system 202 to create a communication link between the computing device hosting supplemental content, whether the supplemental-content sources 216a-216c or the direct supplemental-content source 218 or a third party server, and the content receiver 122 based on a selected bid response. In general, the VAST translation system 206 generates information that the content receiver 122 uses to play the supplemental content, how the supplemental content is to be rendered and shown to a viewer, how long the supplemental-content is to play, if the viewer can skip the supplemental content, etc.

The supplemental-content bid generator 208 may be configured to communicate with the content delivery management system 202 to generate a supplemental-content bid request based on a supplemental-content request that is received from the content receiver 122.

The viewer-specific data system 210 may be configured to obtain or manage or provide access to viewer-specific data associated with the viewer of the content receiver 122. The viewer-specific data may include demographic information about the viewer, device information about the content receiver 122, analytics regarding previous viewing history for the viewer, IP address associated with the content receiver 122, etc.

The supplemental-content caching system 212 may be configured to store or maintain supplemental content that was associated with a bid response that was previously not selected for presentation to the content receiver 122. The supplemental-content caching system 212 may provide the cached supplemental content to the content delivery management system 202 in response to an associated bid response being selected by the supplemental-content selection system 204.

The promotion system 214 may be configured to store or manage other supplemental content that can be utilized along with other selected supplemental content to fulfill supplemental-content requests. This other supplemental content may be utilized as a "gap filler."

The operation of certain aspects will now be described with respect to FIG. 3. Process 300 and 400 described in conjunction with FIGS. 7 and 8 may be implemented by one or more processors or executed via circuitry on one or more computing devices, such as supplemental content system 130 in FIG. 1.

Figure 3:
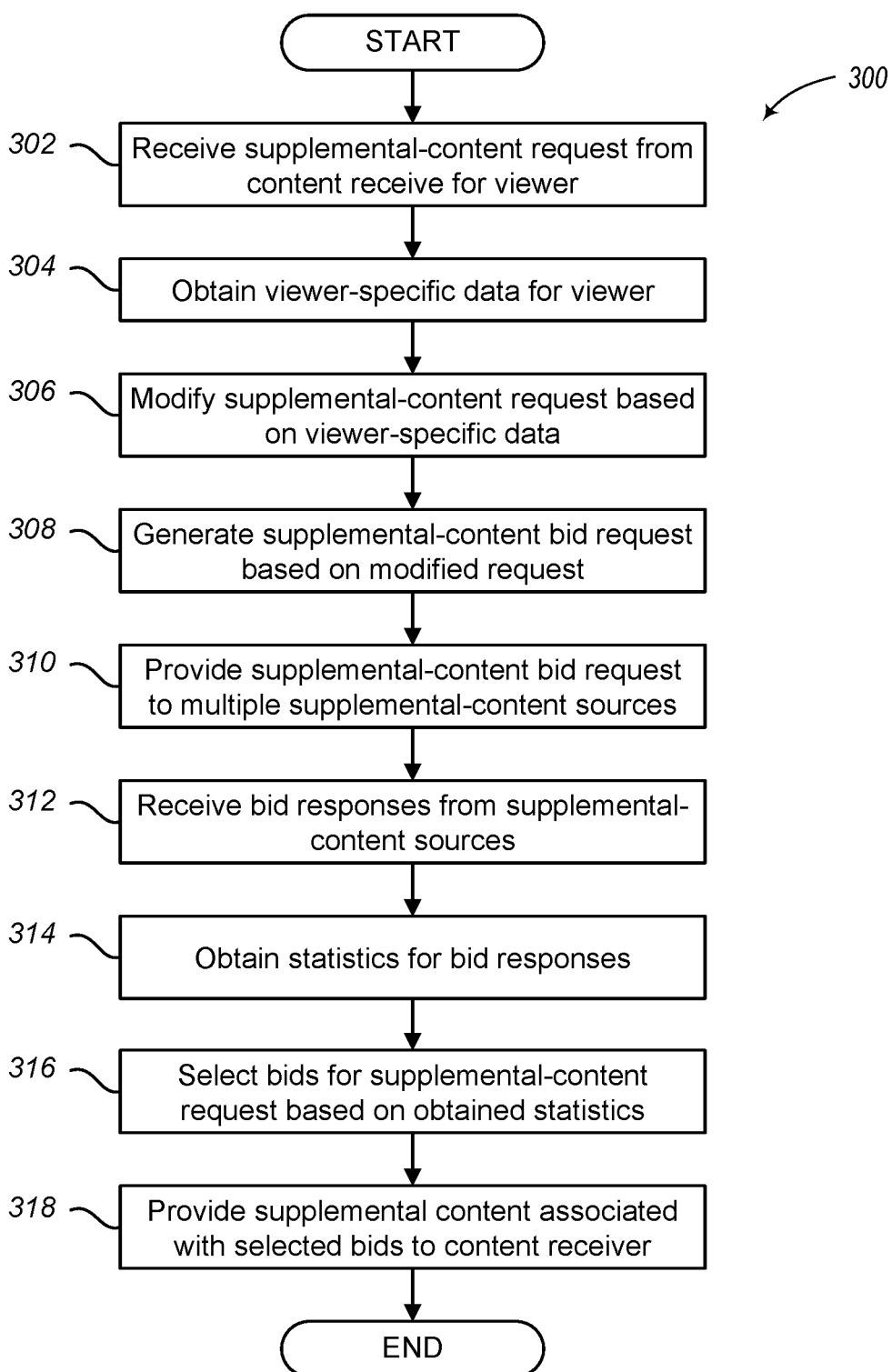
FIG. 3 illustrates a logical flow diagram showing one embodiment of a process for selecting supplemental content for a viewer in accordance with embodiments described herein.

FIG. 3 illustrates a logical flow diagram showing one embodiment of a process 300 for selecting supplemental content for a viewer in accordance with embodiments described herein.

Process 300 begins, after a start block, at block 302, where a supplemental-content request is received for a viewer. In at least some embodiments, the supplemental-content request is received by the content delivery management system 202 in FIG. 2. In various embodiments, the request is received from a content receiver, such as content receiver 122 in FIG. 1. In some embodiments, the content receiver scans or monitors content for supplemental-content markers, tags, or identifiers indicating that supplemental content is to be inserted into the content steam and provided to a viewer. In response to identifying a supplemental-content marker, tag, or identifier, the content receive sends a supplemental content request.

Process 300 proceeds after block 302 to block 304, where viewer-specific data is obtained for the viewer. In at least some embodiments, the viewer-specific data may be stored, maintained, or obtained from viewer-specific data system 210 in FIG. 2.

In various embodiments, the viewer-specific data includes demographic information about the viewer, device information about the device (e.g., content receiver) requesting the supplemental content, analytics regarding previous viewing history for the viewer, IP address associated with the device requesting the supplemental content, subscription type or status for the viewer or content receiver, etc. In some embodiments, the viewer-specific data that is obtained may be selected or determined based on one or more supplemental-content routing rules associated with the supplemental-content request.

Process 300 continues after block 304 at block 306, where the supplemental-content request is modified based on the viewer-specific data. In some embodiments, the viewer-specific data is added to the supplemental-content request. In other embodiments, the supplemental-content request may be modified to include information related to the viewer-specific data. For example, an anonymized geographic location based on the device's IP address may be added to the supplemental-content request instead of using the device's actual IP address.

In some embodiments, the supplemental-content request may be modified based on the subscription type or status for the viewer or content receiver. For example, viewers may subscribed to different tiers at different price points to determine how much supplemental content they will receive. If the viewer is subscribed a supplemental-content-free subscription, then the supplemental-content request may be ignored, unless specific rules indicate that certain types of supplemental content can be provided to the viewer. If the viewer is subscribed to a minimal-supplemental-content subscription, then the supplemental-content request may be modified to reduce the length of time requirement to fulfill the supplemental-content request. But if the viewer is subscribed to a maximum-supplemental-content subscription, then the supplemental-content request may be modified to indicate that the entire length of time requirement identified in the supplemental-content request is to be fulfilled.

Process 300 proceeds next after block 306 to block 308, where a supplemental-content bid request is generated based on the modified request. In at least some embodiments, the supplemental-content bid request may be generated by the content delivery management system 202 or the supplemental-content bid generator 208 in FIG. 2, or some combination thereof.

The supplemental-content bid request is generated to include information regarding the viewer, such as the information included in the supplemental-content request. The supplemental-content bid request may also include additional information regarding the bid request, such as supplemental-content duration, minimum bid amount, number of individual pieces of supplemental-content that can be included in a bid response, identification of content or type of content being provided to the viewer when the supplemental-content request is received, provider of content being provided to the viewer when the supplemental-content request is received, limitations on types of supplemental content, other filters or policies, or other rules to be followed for bid responses. In at least one embodiment, the supplemental-content bid request may be generated following Open Real Time Bidding specifications and requirements. In other embodiments, the supplemental-content bid request may be generated to follow other supplemental-content source specifications or requirements.

Process 300 continues next after block 308 at block 310, where the supplemental-content bid request is provided to a plurality of supplemental-content sources. In at least some embodiments, the supplemental-content selection system 204 in FIG. 2 is utilized to provide the supplemental-content bid request to a plurality of supplemental-content sources, such as supplemental-content sources 216a-216c in FIG. 2. In at least one embodiment, the content delivery management system 202 in FIG. 2 may provide the supplemental-content bid request to other direct supplemental-content sources 218.

In some embodiments, the supplement-content bid request is simultaneously provided to a plurality of different supplemental-content sources. In other embodiments, the supplemental-content bid request is separately tailored for each separate supplemental-content source of a plurality of different supplemental-content sources. For example, the supplemental-content bid request may be modified to accommodate bid request requirements or rules for a first supplemental-content source and separately modified to accommodate bid request requirements for a second supplemental-content source.

Process 300 proceeds after block 310 to block 312, where bid responses are received from one or more of the plurality of supplemental-content sources. In at least some embodiments, the bid responses are received at the supplemental-content selection system 204 in FIG. 2. These bid responses may be received in a variety of different formats, styles, or structures, and may include a variety of different information. For example, for non-FreeWheel supplemental-content sources, the bid response may include: bid-only information without a VAST tag, media URL, or target impressions; bid information along with a VAST tag and target impressions; bid information along with a media URL and target impressions. But for FreeWheel supplemental-content sources, the bid response may include a media URL or VAST tag with associated beacons.

In various embodiments, the bid responses may be processed based on the type of bid response received or the supplemental-content source that provided the bid response. For example, for non-FreeWheel demand sources, if the bid response includes bid-only information without a VAST tag, media URL, or target impressions, then a VAST tag may be created by updating macros from the information received from bid response, pre-selected static bid information, incoming supplemental-content requests from the same or separate content receivers, and utilizing those macros to generate the translation for the VAST tag to find media for the supplemental content associated with the bid request. But for FreeWheel supplemental-content sources, the bid response may have either the media URL with associated beacons or a VAST tag with associated target impressions.

Additional information can also be added to the received bid response, such as a supplemental content identifier. The supplemental content identifier may be generated from the supplemental-content identifier and creative identifier, randomly generated, or generated from the supplemental-content source identifier, or generated from a universal supplemental-content identifier.

In some embodiments, the information associated with a bid response may be included in the bid response. In other embodiments, the information associated with a bid response may be received at a different time or from a third party. For example, the target impressions for a plurality of supplemental content may be received at a select time from the supplemental-content source (e.g., each day the system can obtain a list of target impressions for a plurality of supplemental content from FreeWheel or another supplemental-content source). The information associated with a specific bid response can then be obtained from the pre-received information.

Process 300 continues after block 312 at block 314, where statistics regarding one or more of the bid responses are obtained. In at least some embodiments, the statistics may be stored or maintained by the supplemental-content selection system 204 in FIG. 2 or obtained by the supplemental-content selection system 204 from a third party.

In various embodiments, these statistics may indicate how many previous viewers have been presented the supplemental content associated with a bid response, how many viewers skipped the supplemental content associated with a bid response, how many viewers changed content providers (e.g., changed channels or turned off the device) in response to receiving the supplemental content associated with a bid response, etc.

Process 300 proceeds next after block 314 to block 316, where one or more bids are selected for the supplemental-content request based on the obtained statistics. In at least some embodiments, the supplemental-content selection system 204 in FIG. 2 selects the one or more bids.

In some embodiments, a plurality of highest bids are identified from the bid responses based on information in the bid response and the statistics for those bid responses. In various embodiments, the identified highest bids may include or be greater than a select number of highest bids. In some embodiments, determining whether one bid response is higher than another bid response may be based on the cost per impression for that associated supplemental content. In other embodiments, determining whether one bid response is higher than another bid response may be based on the cost per impression per presentation minute to a viewer for that associated supplemental content. In yet other embodiments, determining whether one bid response is higher than another bid response may be based on the cost per multiple impressions to a plurality of viewers for multiple supplemental-content requests for that associated supplemental content.

In some embodiments, the bid responses, along with their statistics, are compared to one another to select a group of one or more of the bid responses to fill the supplemental-content request. In some embodiments, the highest single bid response that fills the supplemental-content request may be selected. In other embodiments, the highest single bid response that partially, but not completely, fills the supplemental-content request may be selected, along with a next highest one or multiple bid responses that completely fill the supplemental-content request. In this way, if highest bids are not able to fill the entire supplemental-content request, then one or more lower bid responses as compared to the highest one may be selected.

In various embodiments, one or more of the received bid responses that were not selected may be processed and stored for future selection. For example, if a media URL was included or available in the bid response, then the supplemental content for that bid response may be transcoded. In this way, when that bid response is select at a future time, then it's associated supplemental content is already transcoded and ready to be provided to a content receiver. In various embodiments, the supplemental content for these non-selected bid responses may be cached in the supplemental-content caching system 212 in FIG. 2.

Process 300 proceeds after block 318 to block 320, where supplemental content associated with the one or more selected bids are provided to the content receiver. In at least some embodiments, the supplemental-content selection system 204 in FIG. 2 provides the selected bid to the content delivery management system 202 in FIG. 2. The content delivery management system 202 can then process or prepare the supplemental content associated with the selected bid for presentation to the viewer of the content receiver 122.

In various embodiments, the system determines if the supplemental content associated with the selected bid had been previously cached, such as by supplemental-content caching system 212. If the supplemental-content had not previously been cached, then the VAST tag for the selected big is utilized for VAST translation, such as by using VAST translation system 206 in FIG. 2.

If the selected bid requests do not fulfill the supplemental-content request, then additional supplemental content may be selected. For example, in some embodiments, other previously cached supplemental content may be selected to fulfill the supplemental-content request. In other embodiments, other promotional supplemental content may be obtained, such as from promotion system 214 in FIG. 2, to fulfill the supplemental-content request Once the supplemental content associated with the selected bids, and any other supplemental content that is selected to fulfill the supplemental-content request, is processed, then it is sequentially combined and provided to the device that provided the supplemental-content request, such as content receiver 122. In various embodiments, other related metadata, media URLs, or associated third party beacons may also be provided to the requesting device.

After block 320, process 300 terminates or otherwise returns to a calling process to perform other actions.

Figure 4:
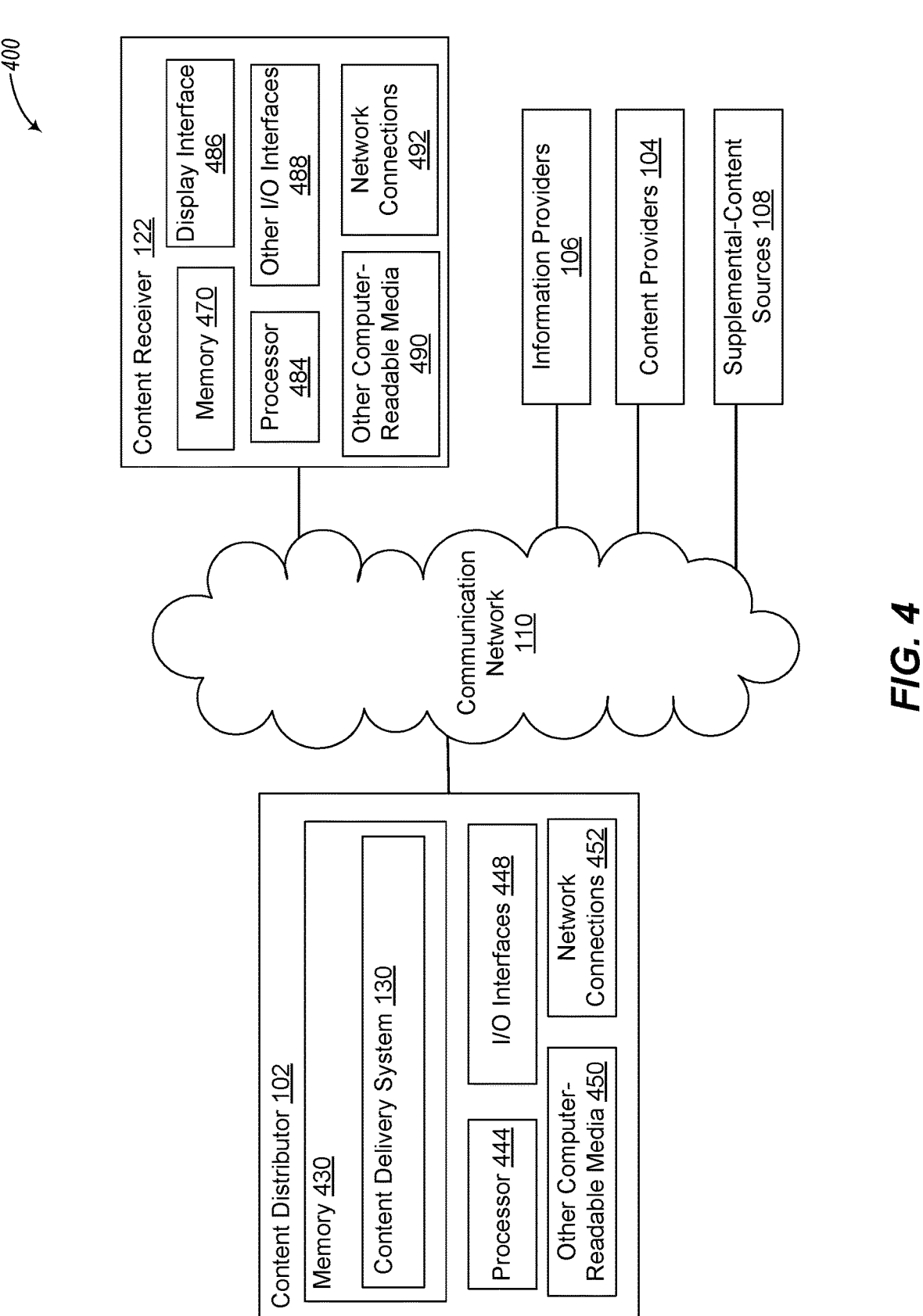
FIG. 4 shows a system diagram that describes one implementation of computing systems for implementing embodiments described herein.

FIG. 4 shows a system diagram that describes various implementations of computing systems for implementing embodiments described herein. System 400 includes content distributor 102, content receiver 122, content provider 104, information provider 106, and supplemental-content sources 108.

Content distributor 102 provides content and supplemental content to content receiver 122 for presentation to a viewer. In general, the content distributor 102 sends supplemental-content bid requests to a plurality of supplemental content sources 108, receives bid responses, and selects one or more bids for their associated supplemental content to be provided to the content receiver 122, as described herein. One or more special-purpose computing systems may be used to implement content distributor 102. Accordingly, various embodiments described herein may be implemented in software, hardware, firmware, or in some combination thereof. Content distributor 102 may include memory 430, one or more processors 444 (e.g., central processing unit, microcontroller, virtual processing resources, etc.), I/O interfaces 448, other computer-readable media 450, and network connections 452.

Memory 430 may include one or more various types of non-volatile and/or volatile storage technologies. Examples of memory 430 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 430 may be utilized to store information, including computer-readable instructions that are utilized by processor 444 to perform actions, including embodiments described herein.

Memory 430 may have stored thereon supplemental content system 130, which is described above in conjunction with FIGS. 1-3. Memory 430 may also store other data or programs (not illustrated).

Network connections 452 are configured to communicate with other computing devices, such as content receiver 122, information providers 106, content providers 104, and supplemental-content sources 108, via communication network 110. I/O interfaces 448 may include a keyboard, audio interfaces, video interfaces, or the like. Other computer-readable media 450 may include other types of stationary or removable computer-readable media, such as removable flash drives, external hard drives, or the like.

Content receiver 122 receives content and supplemental content from content distributor 102. One or more special-purpose computing systems may be used to implement content receiver 122. Accordingly, various embodiments described herein may be implemented in software, hardware, firmware, or in some combination thereof. Content receiver 122 may include memory 470, one or more processors 484, display interface 486, other I/O interfaces 488, other computer-readable media 490, and network connections 492.

Memory 470 may include one or more various types of non-volatile and/or volatile storage technologies, similar to what is described above for memory 430. Memory 470 may be utilized to store information, including computer-readable instructions that are utilized by CPU 484 to perform actions. In some embodiments, the memory 670 may include one or more modules to request supplemental content from content distributor 102.

Display interface 486 is configured to provide content and supplemental content to a display device, such as display device 124 in FIG. 1, for presentation to a viewer. Other I/O interfaces 488 may include a keyboard, audio interfaces, other video interfaces, or the like. Network connections 492 are configured to communicate with other computing devices, such as content distributor 102, via communication network 110. Other computer-readable media 490 may include other types of stationary or removable computer-readable media, such as removable flash drives, external hard drives, or the like.

In some embodiments, information providers 106, content providers 104, and supplemental-content sources 108 include one or more computer devices to provide content, supplemental content, or other information to the content distributor 102. These computer devices include processors, memory, network connections, and other computing components that enable the computer devices to perform actions, but those components are not illustrated in FIG. 4.

The following is a summarization of the claims as filed.

A system may be summarized as comprising: a content delivery management system and a supplemental-content selection system. The content delivery management system may be configured to: receive a supplemental-content request from a content receiver for a viewer; obtain viewer-specific data for the viewer; modify the supplemental-content request based on the viewer-specific data; generate a supplemental-content bid request based on the modified supplemental-content request; and provide supplemental content associated with one or more selected bids to the content receiver for the supplemental-content request. And the supplemental-content selection system may be configured to: provide the supplemental-content bid request to a plurality of supplemental-content sources; receive bid responses from one or more of the plurality of supplemental-content sources; obtain statistics regarding one or more of the bid responses; and select the one or more bids from the one or more bid responses for the supplemental-content request based on the obtained statistics.

The content delivery management system may be further configured to: provide the supplemental-content bid request to the supplemental-content selection system.

The content delivery management system may be further configured to: provide the supplemental-content bid request to one or more direct supplemental-content sources that directly respond with a bid response and corresponding supplemental content for the bid response.

The content delivery management system may be further configured to: receive, from one or more direct supplemental-content sources, a bid response and corresponding supplemental content for the bid response in response to the content delivery management system providing the supplemental-content bid request directly the to one or more direct supplemental-content sources.

The supplemental-content selection system may be further configured to: receive the supplemental-content bid request from the content delivery management system.

The supplemental-content selection system may be further configured to: provide the one or more selected bids to the content delivery management system.

The supplemental-content selection system may be further configured to: identify a plurality of possible supplemental-content sources; and employ at least one rule or requirement to select the plurality of supplemental-content sources from the plurality of possible supplemental-content sources.

The supplemental-content selection system may be further configured to: employ one or more machine learning techniques to determine the plurality of supplemental-content sources in which to provide the supplemental-content bid request.

The supplemental-content selection system may be further configured to: modify the one or more bid responses to include a supplemental-content identifier that informs the content delivery management system of specific details regarding corresponding supplemental content associated with the one or more bid responses.

The supplemental-content selection system may be further configured to: modify the one or more bid responses based on at least one or more rule or requirement associated with the supplemental-content request.

The supplemental-content selection system may select the one or more bids from the one or more bid responses by being further configured to: employ one or more machine learning techniques to select one or more winning bid responses from the one or more bid responses received from one or more of the plurality of supplemental-content sources.

The system may further comprise: a supplemental-content caching system configured to store supplemental content associated with previous bid responses that were not selected and provided to the content receiver in response to previous supplemental-content requests.

The system may further comprise: a translation system configured to provide the content delivery management system with information used to obtain the supplemental content associated with the one or more selected bids to be provided to the content receiver.

A method may be summarized as comprising: receiving a supplemental-content request from a content receiver for a viewer; obtaining viewer-specific data for the viewer; modifying the supplemental-content request based on the viewer-specific data; generating a supplemental-content bid request based on the modified supplemental-content request; providing the supplemental-content bid request to a plurality of supplemental-content sources; receiving bid responses from one or more of the plurality of supplemental-content sources; obtaining statistics regarding one or more of the bid responses; selecting one or more bids from the one or more bid responses for the supplemental-content request based on the obtained statistics; and providing supplemental content associated with the one or more selected bids to the content receiver for the supplemental-content request.

The method may provide the supplemental-content bid request to the plurality of supplemental-content sources by: providing the supplemental-content bid request to one or more direct supplemental-content sources that directly respond with a bid response and corresponding supplemental content for the bid response.

The method may receive the bid responses from the one or more of the plurality of supplemental-content sources by:

receiving, from one or more direct supplemental-content sources, a bid response and corresponding supplemental content for the bid response in response to providing the supplemental-content bid request directly the to one or more direct supplemental-content sources.

The method may further comprise: selecting the plurality of supplemental-content sources from a plurality of possible supplemental-content sources based on at least one rule or requirement associated with the viewer.

The method may further comprise: modifying the one or more bid responses to include a supplemental-content identifier that defines specific details regarding corresponding supplemental content associated with the one or more bid responses.

The method may further comprise: modifying the one or more bid responses based on at least one or more rule or requirement associated with the supplemental-content request.

A computing device may be summarized as comprising: a memory that stores computer instructions; and a processor configured to execute the computer instructions to: receive a supplemental-content request from a content receiver for a viewer; obtain viewer-specific data for the viewer; modify the supplemental-content request based on the viewer-specific data; generate a supplemental-content bid request based on the modified supplemental-content request; provide the supplemental-content bid request to a plurality of supplemental-content sources; receive bid responses from one or more of the plurality of supplemental-content sources; obtain statistics regarding one or more of the bid responses; select one or more bids from the bid responses for the supplemental-content request based on the obtained statistics; and provide supplemental content associated with the one or more selected bids to the content receiver for the supplemental-content request.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a content delivery management system configured to:
    receive a supplemental-content request from a content receiver for a viewer;
    obtain viewer-specific data for the viewer;
    modify the supplemental-content request based on the viewer-specific data;
    generate a supplemental-content bid request based on the modified supplemental-content request; and
    provide supplemental content associated with one or more selected bids to the content receiver for the supplemental-content request; and
a supplemental-content selection system configured to:
    provide the supplemental-content bid request to a plurality of supplemental-content sources;
    receive bid responses from one or more of the plurality of supplemental-content sources;
    obtain statistics regarding one or more of the bid responses; and
    identify the one or more selected bids from the one or more bid responses for the supplemental-content request and identify one or more non-selected bids from the one or more bid responses for the supplemental content request based on the obtained statistics; and a supplemental-content caching system configured to store supplemental content associated with the one or more non-selected bids identified by the supplemental-content selection system.

2. The system of claim 1, wherein the content delivery management system is further configured to:

provide the supplemental-content bid request to the supplemental-content selection system.

3. The system of claim 1, wherein the content delivery management system is further configured to:

provide the supplemental-content bid request to one or more direct supplemental-content sources that directly respond with a bid response and corresponding supplemental content for the bid response.

4. The system of claim 1, wherein the content delivery management system is further configured to:

receive, from one or more direct supplemental-content sources, a bid response and corresponding supplemental content for the bid response in response to the content delivery management system providing the supplemental-content bid request directly to the one or more direct supplemental-content sources.

5. The system of claim 1, wherein the supplemental-content selection system is further configured to:

receive the supplemental-content bid request from the content delivery management system.

6. The system of claim 1, wherein the supplemental-content selection system is further configured to:

provide the one or more selected bids to the content delivery management system.

7. The system of claim 1, wherein the supplemental-content selection system is further configured to:

identify a plurality of possible supplemental-content sources; and employ at least one rule or requirement to select the plurality of supplemental-content sources from the plurality of possible supplemental-content sources.

8. The system of claim 1, wherein the supplemental-content selection system is further configured to:

employ one or more machine learning techniques to determine the plurality of supplemental-content sources in which to provide the supplemental-content bid request.

9. The system of claim 1, wherein the supplemental-content selection system is further configured to:

modify the one or more bid responses to include a supplemental-content identifier that informs the content delivery management system of specific details regarding corresponding supplemental content associated with the one or more bid responses.

10. The system of claim 1, wherein the supplemental-content selection system is further configured to:

modify the one or more bid responses based on one or more rules or requirements associated with the supplemental-content request.

11. The system of claim 1, wherein the supplemental-content selection system selects the one or more bids from the one or more bid responses by being further configured to:

employ one or more machine learning techniques to select one or more winning bid responses from the one or more bid responses received from one or more of the plurality of supplemental-content sources.

12. The system of claim 1, wherein the supplemental-content selection system is further configured to:

determine that the supplemental content for the one or more selected bids was previously stored by the supplemental-content caching system in response to previous bid responses that were not selected; and obtain the supplemental content for the one or more selected bids from the supplemental-content caching system.

13. The system of claim 1, further comprising:

a translation system configured to provide the content delivery management system with information used to obtain the supplemental content associated with the one or more selected bids to be provided to the content receiver.

14. A method, comprising:

receiving a supplemental-content request from a content receiver for a viewer;

obtaining viewer-specific data for the viewer;

modifying the supplemental-content request based on the viewer-specific data;

generating a supplemental-content bid request based on the modified supplemental-content request;

providing the supplemental-content bid request to a plurality of supplemental-content sources;

receiving bid responses from one or more of the plurality of supplemental-content sources;

obtaining statistics regarding one or more of the bid responses;

identifying one or more selected bids and one or more non-selected bids from the one or more bid responses for the supplemental-content request based on the obtained statistics;

providing supplemental content associated with the one or more selected bids to the content receiver for the supplemental-content request; and storing supplemental content associated with the one or more non-selected bids for future supplemental-content requests.

15. The method of claim 14, wherein providing the supplemental-content bid request to the plurality of supplemental-content sources comprises:

providing the supplemental-content bid request to one or more direct supplemental-content sources that directly respond with a bid response and corresponding supplemental content for the bid response.

16. The method of claim 14, wherein receiving the bid responses from the one or more of the plurality of supplemental-content sources comprises:

receiving, from one or more direct supplemental-content sources, a bid response and corresponding supplemental content for the bid response in response to providing the supplemental-content bid request directly to the one or more direct supplemental-content sources.

17. The method of claim 14, further comprising:

selecting the plurality of supplemental-content sources from a plurality of possible supplemental-content sources based on at least one rule or requirement associated with the viewer.

18. The method of claim 14, further comprising:

modifying the one or more bid responses to include a supplemental-content identifier that defines specific details regarding corresponding supplemental content associated with the one or more bid responses.

19. The method of claim 14, further comprising:

modifying the one or more bid responses based on at least one or more rules or requirements associated with the supplemental-content request.

20. A computing device, comprising:

a memory that stores computer instructions; and a processor configured to execute the computer instructions to:

receive a supplemental-content request from a content receiver for a viewer;

obtain viewer-specific data for the viewer;

modify the supplemental-content request based on the viewer-specific data;

generate a supplemental-content bid request based on the modified supplemental-content request;

provide the supplemental-content bid request to a plurality of supplemental-content sources;

receive bid responses from one or more of the plurality of supplemental-content sources;

obtain statistics regarding one or more of the bid responses;

select one or more first bids and one or more second bids from the bid responses for the supplemental-content request based on the obtained statistics; and provide supplemental content associated with the one or more first bids to the content receiver for the supplemental-content request; and cache supplemental content associated with the one or more second bids for future supplemental-content requests.

* * * * *